United States Patent [19]

Semak

[11] Patent Number: 5,226,456

[45] Date of Patent: Jul. 13, 1993

[54] SUPPORT FOR LENGTH OF FLEXIBLE OR LIGHT GAUGE HOSE OR PIPING

[76] Inventor: Mark A. Semak, 21 Harbour Dr., Stoney Creek, Ontario, Canada, L86 3X5

[21] Appl. No.: 803,989

[22] Filed: Dec. 9, 1991

[51] Int. Cl.$^5$ .......................... F16L 11/04; F16L 11/12
[52] U.S. Cl. .................................. 138/107; 138/111; 248/49; 248/61; 248/75
[58] Field of Search ............... 138/103, 106, 107, 111; 248/49, 58, 59, 60, 61, 75; 137/236.1; 4/323; 285/61, 62

[56] References Cited

U.S. PATENT DOCUMENTS

| | | | |
|---|---|---|---|
| D. 308,479 | 6/1990 | Cassity | D8/380 |
| 318,299 | 5/1885 | Samper . | |
| 1,596,418 | 8/1926 | Evans | 138/107 |
| 1,787,106 | 12/1930 | Glazener . | |
| 2,221,919 | 11/1940 | Keman | 137/236.1 |
| 3,006,662 | 10/1961 | Katsuhara | 138/106 |
| 3,272,235 | 9/1966 | Haytock et al. | 138/107 |
| 3,374,013 | 3/1968 | Clay et al. | 285/114 |
| 3,431,947 | 3/1969 | Hines | 138/106 |
| 3,467,013 | 9/1969 | Conner | 137/236.1 |
| 3,493,204 | 2/1970 | Prouty | 248/49 |
| 3,520,244 | 7/1970 | Gaines | 138/107 |
| 3,572,622 | 3/1971 | Smith | 248/49 |
| 3,730,228 | 5/1973 | Gibbs, Sr. | 138/106 |
| 3,809,348 | 5/1974 | Di Laura | 248/49 |
| 3,819,137 | 6/1974 | Smith | 248/49 |
| 4,054,149 | 10/1977 | Nelson | 134/167 |
| 4,064,355 | 12/1977 | Neroni et al. | 138/115 |
| 4,068,824 | 1/1978 | Flynn | 254/124 |
| 4,082,242 | 4/1978 | Smith | 248/83 |
| 4,086,937 | 5/1978 | Hechler | 138/115 |
| 4,102,523 | 7/1978 | Finnell | 248/49 |
| 4,125,237 | 11/1978 | Hagins | 248/49 |
| 4,161,193 | 7/1979 | Freychet et al. | 138/107 |
| 4,169,571 | 10/1979 | Duggan | 248/49 |
| 4,194,711 | 3/1980 | Winton | 248/49 |
| 4,228,978 | 10/1980 | Rand | 248/49 |
| 4,403,758 | 9/1983 | Burt | 248/49 |
| 4,406,434 | 9/1983 | Schneckloth | 248/83 |
| 4,486,725 | 12/1984 | Majkrzak | 138/107 |
| 4,625,631 | 12/1986 | Vera | 248/61 |
| 4,643,229 | 2/1987 | Hickin | 4/323 |
| 4,722,500 | 2/1988 | Bray | 248/49 |
| 4,905,939 | 3/1990 | Horn | 248/49 |
| 5,007,605 | 4/1991 | Horvath | 248/62 |
| 5,023,959 | 6/1991 | Mercer | 4/323 |
| 5,082,028 | 1/1992 | Jean-Jacques | 138/106 |
| 5,137,057 | 8/1992 | Hummert | 138/107 |

FOREIGN PATENT DOCUMENTS

| | | | |
|---|---|---|---|
| 14012 | 8/1904 | Norway | 138/107 |
| 1084299 | 9/1967 | United Kingdom | 138/107 |
| 2032044 | 4/1980 | United Kingdom | 138/107 |

*Primary Examiner*—James E. Bryant, III
*Attorney, Agent, or Firm*—Weldon F. Green

[57] ABSTRACT

Improved equipment for supporting a length of flexible drainage hose or piping to extend along a substantially uniform gradient that includes the combination of an open ended flexible tubular element or sleeve for receiving and supporting therein the intermediate segment of a selected drainage hose or piping, with a length of cord or line aligned with and carrying the flexible tubular element or sleeve depending therefrom and therealong. The respective ends of the cord or line extend beyond the respective open ends of the tubular element or sleeve for securing the cord or line in sufficiently taut relation and in an orientation to establish a substantially uniform gradient for the supported length of flexible drainage hose or piping.

14 Claims, 3 Drawing Sheets

SUPPORT FOR LENGTH OF FLEXIBLE OR LIGHT GAUGE HOSE OR PIPING

FIELD OF THE INVENTION

This invention relates to improvements in equipment for supporting a length of flexible or light gauge drainage hose or piping so as to establish a substantially uniform gradient for imparting uninterrupted fluid flow therethrough under gravity.

BACKGROUND OF THE INVENTION

Many motor homes, campers, and other recreational vehicles are equipped with toilets, showers, and sinks and, as a consequence, include within their systems holding tank facilities into which water and waste drain to be retained for later discharge into a sewer or other waste collection tank.

Holding tank facilities are typically provided with a discharge outlet and associated valve mechanism lowermost which are usually presented to the rear or to one side of the vehicle for ready attachment to one end of a suitable drainage hose or piping which can enter or be connected at its other end to a sewer inlet or other collection or storage tank located at the campground or mobile home site or at other designated locations in order to drain the vehicle holding tank and remain so connected for such purpose if vacationing or parked for an extended period of time.

The preferred drainage hose or piping is usually flexible or of light gauge and can be collapsible along its axis for ready storage, and of sufficient extended length to accommodate the drainage path or run leading from the vehicle holding tank discharge outlet to the sewer or collection or storage tank inlet.

The preferred drainage path or run extending from the vehicle holding tank to the sewer or collection or storage tank descends along a direct substantially uniform gradient so that an uninterrupted intermittent or continuous discharge of water and waste under gravity will be ensured. Consequently, it is important that any flexible or collapsible drainage hose be sufficiently supported over such a path so as to substantially maintain the required gradient.

Many proposals have been put forward which utilize intermittent or continuous ground engaging framework for supporting such flexible discharge hoses or piping, some including stiffened or extensible support segments or combinations thereof for establishing and maintaining the required flow gradient and orientation as revealed by the following U.S. Pat. Nos. 3,493,204, 3,572,622, 3,730,228, 3,809,348, 4,082,242, 4,194,711, 4,722,500, and 4,905,939.

It will be appreciated that any stiffened ground engaging framework will reflect the unevenness or contour of the location which would be imparted to the drainage hose and possibly interfere with or impede the flow rate, and, consequently, adjustments to the structure along the path would be required.

Further, some stiffened or extensible support segments of some proposals cannot readily accommodate changes in direction of the flexible discharge hose around obstacles such as bushes, trees, rocks, or the like, and will require still further adjustments or bending in order to properly orient the hose to establish and maintain the desired flow gradient.

An optimum gradient of the discharge flow path not only assists in ready continuous or intermittent drainage of the vehicle holding tank, but also facilitates thorough flushing out of the whole system including the flexible or collapsible hose itself which is especially important since the hose is to be stored in the vehicle and may remain in storage for lengthy periods.

OBJECTS OF THE INVENTION

It is an object of this invention, therefore, to provide an improved support for a flexible or collapsible discharge hose or piping whereby the requisite optimum gradient for drainage can be readily established between inlet and outlet independently of the contour of the surface, a change in direction introduced if an obstacle is encountered, and a shortened or extended length of such flexible collapsible hose or piping accommodated, where necessary.

It is a further object of this invention to provide an improved support which can be applied and set up or removed with comparative ease, compactly stored when not in use individually, or as part of the combination of hose support and drainage hose itself.

It is also an object to provide an improved drainage hose support that presents an extended exposed surface which can be imprinted or otherwise marked to serve, for example, as an advertising or promotional item in the sale or rental of recreational vehicles and other associated equipment, or for instructional purposes.

Moreover, it is an object of this invention to provide an improved drainage hose support derived from materials that can be readily washed or cleansed when required.

It is also a very important object of this invention to provide a hose support which can be produced, packaged, and distributed at comparatively low cost.

FEATURES OF THE INVENTION

One important feature of this invention resides in providing, for a system wherein fluid is to be discharged therefrom intermittently or continuously along a drainage fluid flow path, the combination of an open ended flexible tubular formation defining the flow path with a support formation extending longitudinally thereof and so linked to the tubular formation as to suspend same therefrom and impart a substantially uniform gradient thereto sufficient to generate fluid flow under gravity along the drainage fluid flow path so defined.

More particularly, the present invention in its preferred embodiment includes the combination of an open ended flexible sleeve-like component having a configuration sufficient so as to receive and orient a selected hose length in substantially aligned relation therewithin with a support formation presented by the flexible sleeve-like component to extend longitudinally peripherally thereof including a line or cord linked thereto and displaceable therealong, whereby, with the line or cord drawn taut and anchored against slippage, the tubular formation and hose length to be supported thereby is suspended therefrom and a selected orientation imparted thereto.

It is also a feature of this invention to provide the flexible tubular element in the form of a fully collapsible sleeve so that same can be gathered intermediately to accommodate the extent of the selected hose length and, in the preferred embodiment, from an elongated section of suitable flexible light gauge sheet material folded upon itself lengthwise and secured along the opposed longitudinal edges by stitching or by heat sealing, or joined together in any other suitable manner depending upon the nature of the selected sheet material.

It is also a feature of this invention to link the open ended sleeve with the displaceable cord length by additionally joining the material of the sleeve along a line or seam spaced uniformly inwardly from the joined longitudinal edges, one compartment so defined being adapted to receive the drainage hose segment and the other compartment being adapted to receive the cord length or line to be threaded therethrough and to extend therebeyond for suspending the sleeve and hose length to be inserted therein in the requisite orientation.

It will also be appreciated that if a woven fabric is selected for constructing the tubular formation or sleeve the aligned pair of tubular or sleeve-like compartments so defined can be readily gathered or fully extended along the length of the cord or line to accommodate either a shortened or an extended length of drainage hose to be supported.

Still another feature resides in selecting a cord length or line derived from normally substantially non-extensible material, such as Nylon TM, for use with a non-slip clip and a clamp at each end, respectively, such as those utilized in mountaineering, whereby the required tautness will be maximized under most conditions encountered.

Still another feature resides in selecting suitably textured or finished fabric, or otherwise treating the surface of the selected sheet material used in the production of the tubular formation or sleeve-like component, so as to be receptive to printing or to the attachment of advertising indicia.

It will be understood that such a lightweight flexible tubular formation or sleeve-like component linked to and supported by a length of cord or line can readily accommodate any change in direction dictated by the topography and, where required, the optimum gradient maintained by supporting the cord or line intermediately of its length as it passes around an obstacle either upon a suitable peg driven into the ground or from the obstacle itself.

DESCRIPTION OF THE INVENTION

Figure 2:
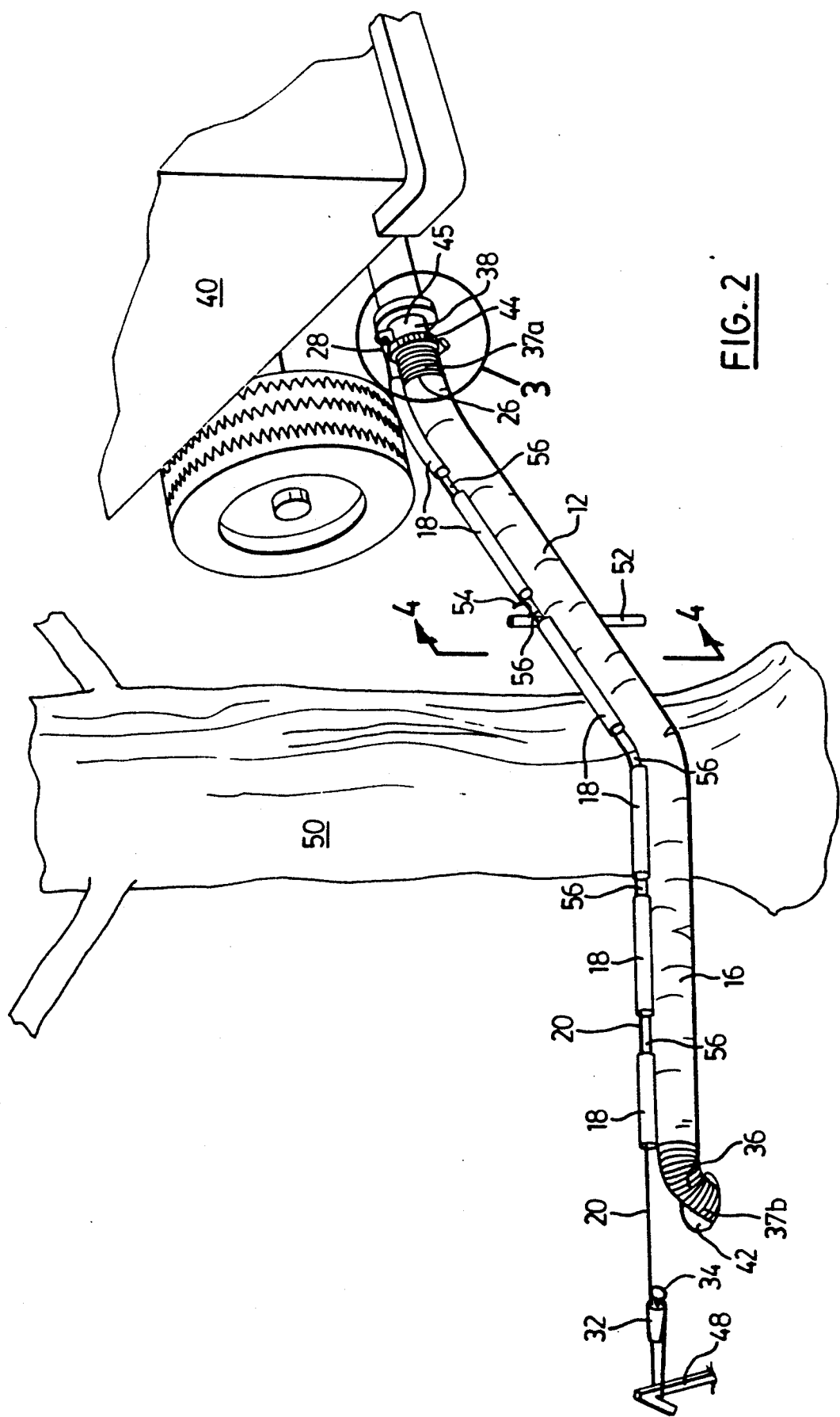
FIG. 2 is a perspective view illustrating a slightly modified embodiment of the improved hose support of FIG. 1 showing the modified hose support fitted with a discharge hose and oriented to descend from the outlet of a holding tank of a recreational vehicle to the inlet of a sewer or collection or storage tank located at a campground or mobile home site.
Figure 3:
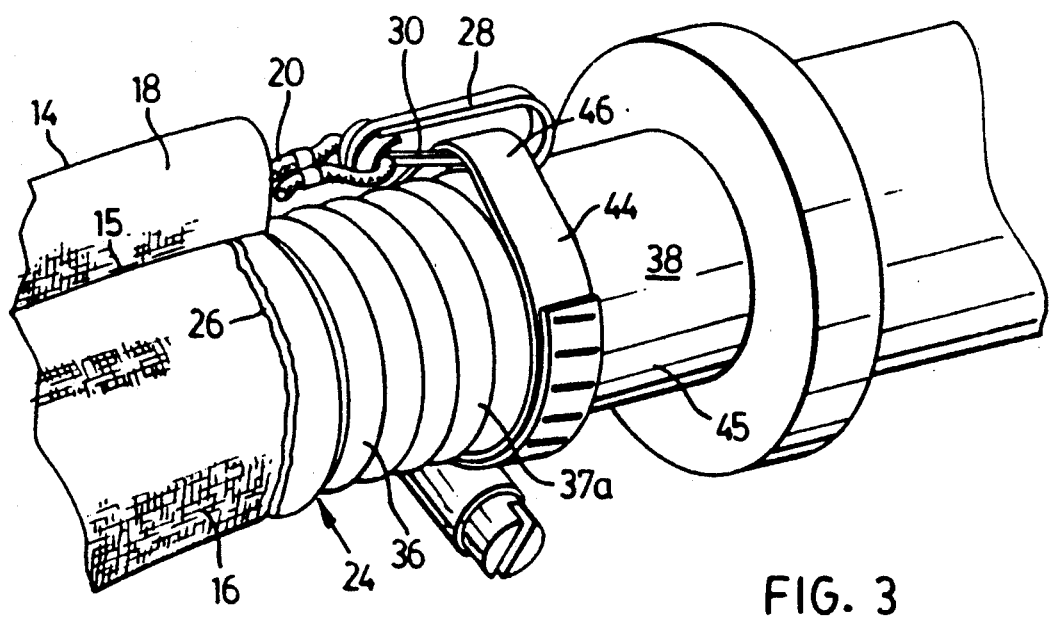
Figure 4:
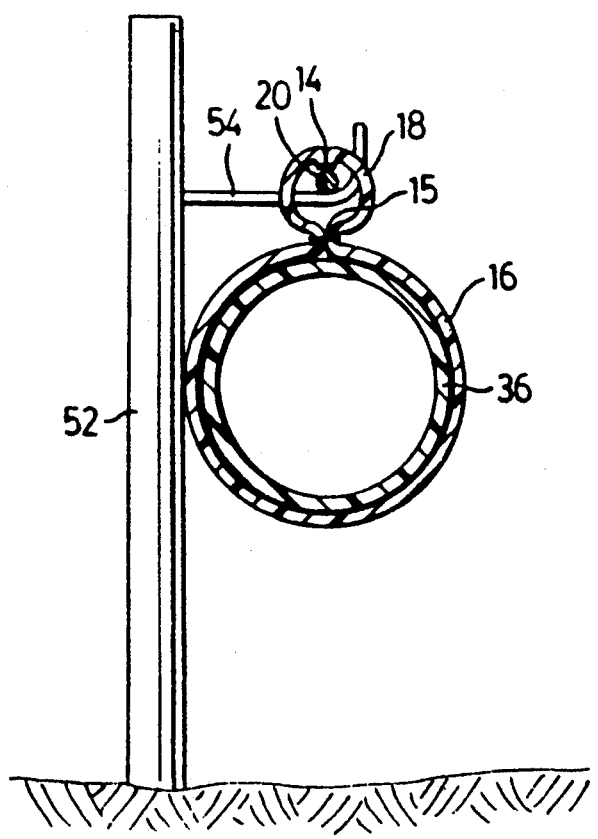

FIG. 3 is an enlarged perspective view of the connection of the discharge hose and hose support to the outlet of the holding tank of the vehicle illustrated in FIG. 2; and FIG. 4 is an enlarged cross-sectional view taken along the lines 4—4 of FIG. 2, illustrating how additional support may be imparted to the combined hose support and discharge hose intermediately of the flow path to maintain the optimum gradient.

Figure 1:
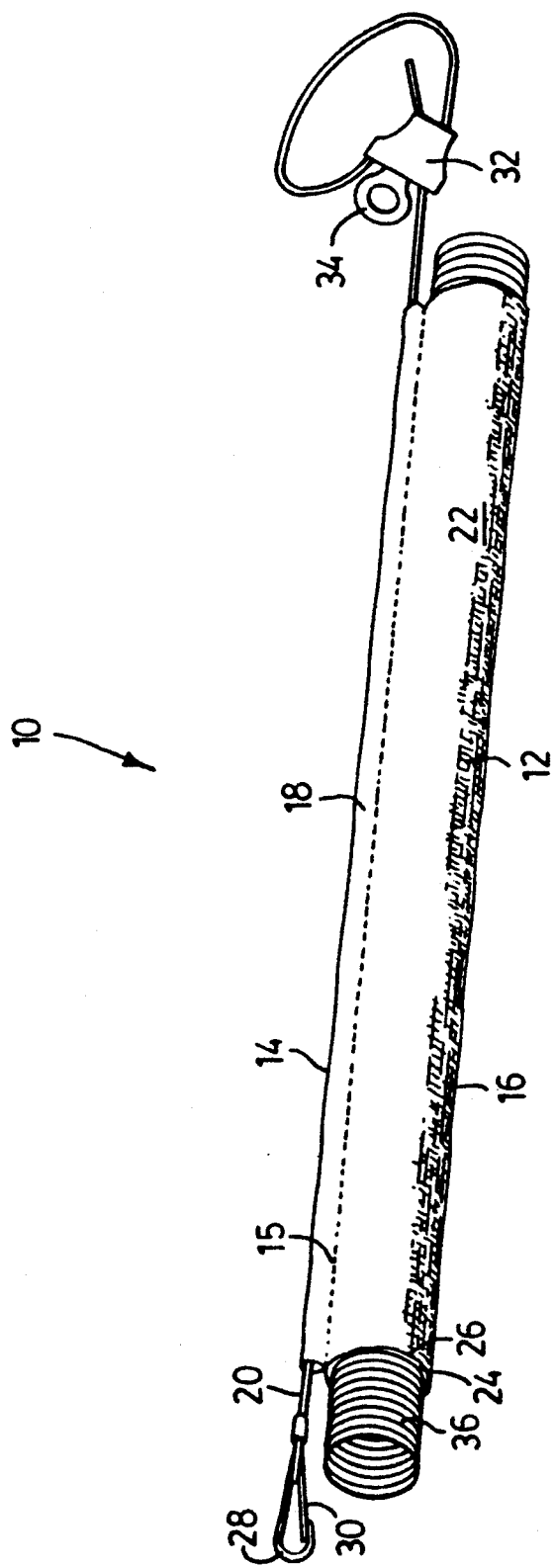
FIG. 1 is a perspective view illustrating a preferred embodiment of an improved drainage hose support constructed in accordance with the invention.

Hose support 10, according to the preferred embodiments illustrated in FIGS. 1 and 2, includes a tubular formation 12 in the form of a length of suitable soil resistant flexible sheet material appropriately folded upon itself lengthwise and stitched or heat sealed as at 14 along the opposed edges and stitched or heat sealed along a line or seam 15 spaced uniformly inwardly therefrom to form a pair of aligned, open ended, tubular or sleeve-like compartments 16 and 18 for receiving and supporting respectively the intermediate segment of a length of flexible discharge hose to be inserted therein and a length of cord or line 20 to be threaded therethrough.

Preferably open end 24 of sleeve 16 has a length of elasticized material 26 stitched or otherwise secured throughout the circumference thereof for suitably releasably gripping the outer surface of a flexible drainage hose to be inserted therein so as to securely position such end 24 close to the drainage hose connection to the vehicle.

Flexible tubular formation 12 in the preferred embodiment is derived from woven synthetic fabric, such as Nylon TM, but other suitable soil resistant synthetic or natural fibres or plastic sheeting can be substituted.

The selected sheet material for tubular formation 12 must have sufficient thickness and inherent strength to support and maintain the load of the discharge hose under fluid flow conditions at the required gradient over an extended period of time and over a range of environmental conditions.

Further, it will be appreciated that by choosing flexible woven sheet material, such as Nylon TM, the hose support can be readily washed or cleansed in a basin or in a stream.

Moreover, such material can be supplied in a variety of colours and surface 22 of sleeve 16 readily imprinted or decorated with logos or advertisements to attract customer attention.

In the preferred embodiment of the invention, tubular formation 12 comprising sleeve like compartments 16 and 18 has a length of the order of 7 feet, with a circumference for larger sleeve-like compartment 16 of the order of 12 inches and with a circumference for smaller sleeve-like compartment 18 of the order of 2 inches.

The circumferences are chosen to allow for ready insertion of the drainage hose through sleeve-like compartment 16, and cord or line 20 through sleeve-like compartment 18, but sufficiently limited to prevent easy disengagement of either the drainage hose or cord or line 20 therefrom when installing same.

Cord or line 20, in the preferred embodiment, is also derived from synthetic fibres, such as Nylon TM, which have the capability of withstanding most environmental conditions to be encountered, yet continue, when drawn taut, to support the combined weight of a flexible discharge hose or piping with water and waste flowing therethrough over extended periods of time.

In the preferred embodiment, cord or line 20, once threaded through tubular compartment or sleeve-like compartment 18 of hose support 10 and so linked thereto, is provided at one end with a suitably anchored clip 28, preferably of strong durable plastic construction which takes the form of a hook with a hinged elongated closure member or tongue 30 normally strongly biased to the closed position.

The other end of cord or line 20 is provided, in the preferred embodiment of the invention, with a mountaineering type cordlock 32, in which a key 34 is manipulated to secure cord or line 20 against significant slippage when pulled to the required tension or tautness.

FIGS. 2, 3, and 4, illustrate how improved hose support 10 embodying the invention is used in suspending and supporting a drainage or discharge hose 36 connected at one end to outlet 38 of a holding tank of a recreational vehicle 40, and discharging at its other end into inlet 42 of a sewer located at the campground or mobile home site.

Once a recreational vehicle is parked at a campground or mobile home site in the proper location it will be desirable to connect discharge hose 36 between the holding tank of vehicle 40 and the campground sewer or collection tank facility.

The first time hose support 10 is used, or after each washing or cleaning, discharge hose 36 will be threaded through sleeve-like compartment 16 of hose support 10 to the extent so that ends 37a, 37b of hose 36 are presented slightly beyond respective ends of sleeve 16 thereof, and with elasticized end 24 of sleeve 16 located near upper end 37a of discharge hose 36 to be connected to outlet 38 of the holding tank of vehicle 40.

The length of the selected run of discharge hose 36 will be accommodated by sleeve-like compartments 16 and 18 since they can be gathered intermediately along cord or line 20 to position the lower end of sleeve compartment 16 slightly inwardly of lower end 37b of discharge hose 36.

It will be appreciated that since outlet 38 of the holding tank of vehicle 40 is higher than inlet 42 of sewer inlet 42, there will be a tendency for sleeve 16 of hose support 10 to slip downwardly and possibly alter the orientation of discharge hose 36 in its descent towards sewer inlet 42.

Elasticized end 24 of sleeve 16 is designed to sufficiently grip the outer surface of discharge hose 36 in a region adjacent to outlet 38 to minimize slippage and properly position same before cord or line 20 is tightened.

Further with certain flexible light gauge discharge hoses which have a corrugated configuration elasticized end 24 of sleeve 16 will grip between the corrugations thereby effectively limiting such slippage along the outer surface of discharge hose 36. Moreover, the other end of sleeve 16 can be elasticized, if desired, which will serve to likewise position such end next adjacent to lower end 37b leading to sewer inlet 42 which would be advantageous if the run of discharge hose 36 is relatively short.

Once tubular or sleeve-like compartment 16 of hose support 10 is drawn over and correctly positioned upon the intermediate segment of drainage or discharge hose 36, end 37a of hose 36 is connected to outlet 38 of the holding tank of recreational vehicle 40.

In particular, a suitable ring clamp 44, of well known construction and best illustrated in FIG. 3, can be used to quickly clamp discharge hose 36 to pipe extension 45 of outlet 38.

Clip 28 of cord 20, extending beyond the end of tubular compartment of sleeve 18 can then be secured above upper end 37a of discharge hose 36 to a loop of clamp 44 as at 46, or to a suitable eye (not shown) mounted on the vehicle in the region above outlet 38.

Lower end 37b of drainage or discharge hose 36 is then inserted into inlet 42 of the sewer or collection tank.

Cordlock 32 of cord or line 20, extending beyond the lower end of sleeve 18 of hose support 10, is then adjusted along cord or line 20 for securing same in taut relation to an upright standard, stanchion, or to a suitably anchored peg 48 in a region adjacent to inlet 42 of the sewer, but at an elevation slightly higher than the point where drainage hose 36 enters sewer inlet 42.

Through manipulation of key 34 of cordlock 32 to establish the appropriate required length cord 20, when pulled taut and anchored, can be substantially secured against slippage whereby the intermediate segment of discharge hose 36 is oriented along a substantially uniform gradient, and suspended above any uneven terrain feature therebelow.

Also, with hose support 10 of the invention, the gradient imparted to discharge hose 36 can be substantially maintained even while routing the supported discharge hose 36 around an intervening obstacle, such as tree 50 in the manner illustrated in FIG. 2; the combination of the inherent flexible nature of both hose support 10 and supported discharge hose 36 readily accommodating such a change in direction.

Should the gradient to be established extend over a longer distance, discharge hose 36, notwithstanding the substantial tension of cord 20, could dip under gravity at an intermediate point along its length. To minimize such deformation and maintain optimum fluid flow in these circumstances, hose support 10 can be modified so as to expose cord or line 20 at intervals along tubular formation 12 for engagement with an intermediate suitably anchored peg or post 52 from below, as illustrated in FIG. 2 and more specifically depicted in FIG. 4, or to suspend same from above.

Peg or post 52 in this alternative as illustrated in FIG. 4, is provided with a suitable hook 54 for engaging a section of cord or line 20 to provide an appropriate support for the cord from below, but suspension from above using hook 54 could easily be provided.

In order that hook 54 of support peg or post 52 can readily engage cord 20, sleeve-like compartment 18 is modified, as illustrated in FIG. 2, by removing sections thereof along its length, as at 56, thereby exposing the threaded cord or line 20 at intervals for engagement with hook 54.

Before leaving a campground or mobile home site the system, and especially the vehicle holding tank 39 and discharge hose 36, will likely be thoroughly flushed out.

The tension of cord 20 when released through appropriate manipulation of key 34 of cordlock 32, allows for detachment from support peg or post 48 and withdrawal of lower end 37b of discharge hose 36 from sewer inlet 42.

Ring clamp 44 is then loosened so that upper end 37a of discharge hose 36 can be disconnected from outlet 38 of the holding tank of recreational vehicle 40, and clip 28 of cord 20 disconnected from the anchoring eye or the encircling band of ring clamp 44.

Hose support 10 can then be separated from discharge hose 36 and washed or folded up for storage.

It will be appreciated that when washing is not required, hose support 10 and hose 36 can be collapsed together or folded up for storage without being separated, and the combined structure thereafter serve the need of providing for discharge of water and waste.

While specific embodiments of this invention have been illustrated and described herein, alternatives or modifications can be undertaken by those persons skilled in the art without departing from the spirit and scope of the appended claims.

What I claim is:

1. In a system wherein fluid is to be discharged therefrom along a drainage fluid flow path, the combination with said system of an open ended flexible tube having a continuous uninterrupted extent from end to end to define said flow path, and a flexible support formation therefore extending longitudinally thereof and collapsible in its extent so that same can be gathered intermediately to accommodate the extent of said flexible tube, and means linking said flexible support formation to said flexible tube so as to suspend same therefrom and to impart a substantially uniform gradient thereto sufficient to generate fluid flow therealong.

2. A system according to claim 1 wherein said flexible tube includes an open ended flexible sleeve-like component collapsible in its extent so that same can be gathered intermediately to accommodate the extent of said flexible tube, and said flexible support formation includes a linear component extending longitudinally peripherally of said flexible sleeve-like component, and in which said linking means is presented by said flexible sleeve-like component to said linear component.

3. In a hose support the combination with an open ended flexible tube having a continuous uninterrupted extent from end to end to define a fluid flow path of a support formation extending longitudinally thereof and collapsible in its extent so that same can be gathered intermediately to accommodate the extent of said flexible tube, and means linking said support formation to said open ended flexible tube so as to suspend same therefrom and to impart a substantially uniform gradient thereto sufficient to generate fluid flow therealong.

4. A hose support according to claim 3 wherein said flexible tube includes an open ended flexible sleeve-like component having a configuration sufficient so as to receive and orient a selected hose length in substantially aligned relation therewithin said collapsible in its extent so that same can be gathered intermediately to accommodate the extent of said flexible tube.

5. In a hose support the combination with an open ended flexible tube having a continuous and uninterrupted extent from end to end and having a configuration sufficient so as to receive and orient a selected hose length therewithin so as to define a discharge fluid flow path therethrough and be collapsible in its extent so that same can be gathered intermediately to accommodate said selected hose length of a support formation including a linear component extending longitudinally peripherally of said flexible tube and likewise being collapsible in its extent so that same can be gathered intermediately to accommodate the extent of said selected hose length and means linking said linear component to said flexible tube so as to suspend same therefrom whereby a substantially uniform gradient sufficient to generate fluid flow under gravity can be imparted thereto.

6. A hose support according to claim 5 wherein said linking means includes an open ended flexible tube which is presented by said flexible tube for receiving said selected hose length therewithin so as to extend longitudinally peripherally thereof and likewise being collapsible in its extent so that same can be gathered intermediately to accommodate the extent of said selected hose length and of a configuration so as to receive and orient said linear component in substantially aligned relation therewithin.

7. A hose support according to claim 6 wherein said open ended flexible tube of said linking means is comprised of longitudinally separated segments so as to expose said linear component in that region extending between said separated segments.

8. A hose support according to any one of claims 5, 6, or 7, wherein said linear element comprises a length of cord.

9. A hose support according to any one of claims 5, 6, or 7, wherein means are provided in the region of the circumference of one open end of said flexible tube for receiving said selected hose length therewithin for constricting same whereby a selected hose length received and oriented therewithin can be substantially gripped thereby.

10. A hose support according to claim 5 wherein said linear component comprises a length of cord provided at opposed ends with means for selectively securing same in spaced apart relation to impart tautness thereto whereby the cord length can be oriented for suspending said flexible tube therefrom.

11. A hose support according to claim 5 wherein said flexible tube is derived from a thin sheet of flexible material.

12. A hose support according to claim 11 wherein said flexible sheet material is derived from woven fabric.

13. A hose support according to claim 10 wherein one of said securing means includes mountaineering cord lock means for applying and maintaining the required tautness to said length of cord.

14. In a method for supporting a length of flexible discharge hose above and independently of terrain extending therebelow and imparting a substantially uniform gradient thereto sufficient for generating fluid flow therethrough, the step of selecting an appropriate length of flexible discharge hose, the step of providing said hose length with a length of a linear component collapsible in its longitudinal extent so that same can be gathered intermediately to accommodate said hose length and capable of supporting said flexible discharge hose therefrom and to extend longitudinally peripherally thereof and therebeyond at each end, the step of linking said lengths of linear component to said hose length and gathering same intermediately thereof to accommodate said hose length in a manner so as to suspend same therefrom and therealong, and the step of securing the opposed ends of said linear component in a manner to impart a substantially uniform gradient thereto whereby fluid flow can be generated through the length of flexible discharge hose suspended therefrom.

* * * * *